Feb. 15, 1966 E. M. CROWELL 3,235,520
RESINOUS NON-TACKY THERMOPLASTIC ADHESIVE
COMPRISING RESINOUS LINEAR TERPOLYESTER
OF A LINEAR GLYCOL AND ACID COMPONENTS
Filed June 27, 1960

*Inventor*
*Ernest M. Crowell*
*By his Attorney*
*Benjamin C. Pollard*

United States Patent Office 3,235,520
Patented Feb. 15, 1966

3,235,520
RESINOUS NON-TACKY THERMOPLASTIC ADHESIVE COMPRISING RESINOUS LINEAR TERPOLYESTER OF A LINEAR GLYCOL AND ACID COMPONENTS
Ernest M. Crowell, Beverly, Mass., assignor, by mesne assignments, to United Shoe Machinery Corporation, Boston, Mass., a corporation of New Jersey
Filed June 27, 1960, Ser. No. 39,098
3 Claims. (Cl. 260—22)

This invention relates to new hot melt resin polymer adhesives and particularly to a hot melt resinous adhesive adapted to form rapidly a strong resilient bond between a fibrous insole rib and a fibrous insole.

Hot melt adhesive bonding is effective in many relations; but as heretofore known hot melt adhesives capable of setting up quickly to form a strong bond have been hard, unyielding materials. For most bonding problems, this type of bond has been satisfactory. However, in the bond between an insole rib and a fibrous insole such as the well-known synthetic rubber impregnated water laid fiber materials, rigid adhesives localize stresses and cause failure of the bond when the assembly of rib and insole is flexed or distorted. Prior to the present invention, bonding of insole and rib has been effected by the use of natural or synthetic rubber base adhesives applied as water base dispersions or latices or in solvent solution. The applied rubber base adhesives have had to be dried and usually heated locally immediately before the rib was pressed against the insole. Rubber base materials have not had the heat resistance for the viscosity characteristics in heated condition fitting them for application as hot melts.

It is an object of the present invention to provide a new adhesive applicable as a hot melt to form rapidly a strong bond and possessing the resilience and flexibility which are important for the special problem of holding together an insole rib and insole.

To this end and in accordance with a feature of the present invention, I have provided a resinous polymer adhesive possessing desirable viscosity characteristics so that it may be applied in molten form and will solidify rapidly on cooling to a state capable of maintaining parts in bonded relation while providing in the fully cooled adhesive a rubbery characters giving a high bond strength.

I have discovered a new substantially linear resinous polymer of which the molecule chain is made up of monomer residue units of divergent characteristics in a special range of relative proportion giving to the polymer the special characteristics for use as a hot melt adhesive.

Figure 1:
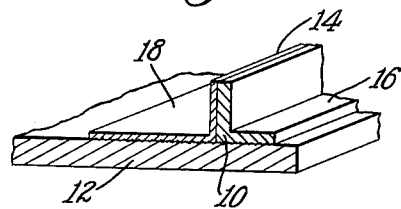
Figure 2:
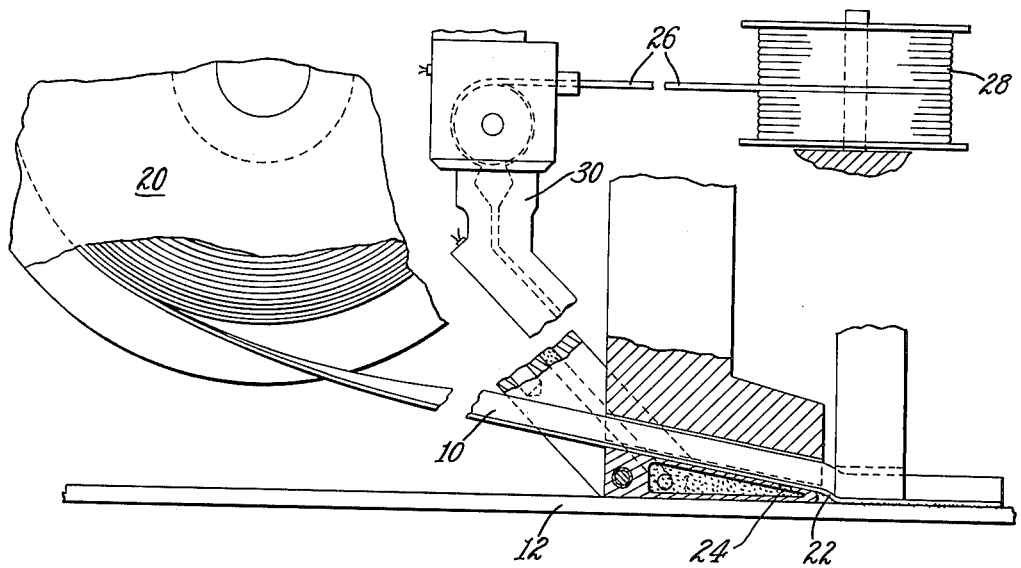

The invention will be described in connection with use of the new adhesive in bonding insole ribs to insoles as illustrated in the attached drawings in which, FIG. 1 is an angular sectional view illustrating a ribbed strip attached to an insole; and FIG. 2 is an elevational view partly in cross section illustrating the attachment of a ribbed strip to an insole by a method employing the adhesive of the present invention.

The linear polyesters of the present invention are the products of the reaction and polymerization of a glycol with a mixture of acid components in certain ranges of relative proportions, the acid components including terephthalic and isophthalic acids or, preferably, their methyl esters and an acid material commonly known as a dimerized vegetable oil fatty acid. The dimerized vegetable oil fatty acid material is obtained by polymerization of polyunsaturated vegetable oil acid e.g. linoleic acid from soybean, cottonseed, or linseed oils by heating in the presence of water using sufficient pressure to prevent decomposition as disclosed more fully in United States Patent No. 2,482,761 to Charles J. Goebel, issued September 27, 1949. The product has an apparent molecular weight of about 600 and an equivalent weight of about 300, and is composed primarily (95%) of molecules containing 36 carbon atoms and having two carboxyl groups, the balance including some monomeric acid and some trimer molecules containing 54 carbon atoms and having three carboxyl groups. Preferably, the proportion of monomer acid is less than 1% and that of the trimer less than 5 or 6%. However, a mixture having as much as 25% of the trimer may be used. A hydrogenate of a dimer acid may also be used.

The glycols used have the formula $HO(CH_2)_nOH$, where $n$ is an even number greater than 1 but not over 10. The preferred glycols have from 2 to 6 carbon atoms. A preferred glycol is 1,4 butylene glycol either alone or in combination with polybutylene glycol having a molecular weight between 1,000–2,000.

The relative proportions of the terephthalate, isophthalate and dimerized fatty acid components are important to secure the desired properties. It has been found that the reaction mixture should contain from 4 to 20 mol percent, preferably from 7 to 8 mol percent of the dimerized fatty acid with from 96 to 80 mol percent of the terephthalate and isophthalate components; and that the terephthalate and isophthalate components should be present in the molar ratio of from 6:4 to 9:1. Any given percentage of dimerized fatty acid component within the above range in combination with terephthalate and isophthalate components in any relative proportions in the above range of ratios gives to the resin approximately the same increase in the desired rubbery character without interfering with initial bond formation.

The viscosity of the terpolymer which gives the desired properties of rubberyness and a strong bond will be in the range of 50–250 poises at 238° C. (Brookfield viscometer model LVF, #4 spindle at 20 r.p.m. and 238° C.)

Different ratios of terephthalate to isophthalate while influencing the stiffness of the polymer somewhat, apparently mainly affect the temperature and speed of setting of the resin from molten condition.

The following explanation of this effect is given as of possible assistance in understanding the invention but it is to be understood that patentability does not depend on the correctness of the explanation.

Terephthalate polyesters have a strong tendency to crystallize on cooling from molten condition because of the symmetry of the molecules.

Isophthalate polyesters because of their asymmetry have a much lower tendency to crystallize than do terephthalate polyesters.

Dimerized fatty acid polyesters have substantially no tendency to crystallize because of their long unsymmetrical carbon chain and are so different in properties from terephthalate and isophthalate polyesters that they are incompatible.

Esterification and polymerization of a mixture of terephthalic and isophthalic acids or their esters and dimerized fatty acid with a glycol joins together these components in molecular union. In many respects, however, the resulting tripolyester behaves like a mixture of the three single polyesters. That is, the long dimerized fatty acid residues in the molecule permit sufficient freedom of movement of terephthalic acid and isophthalic acid residues that, for example, a terephthalate acid residue in one molecule can orient itself with respect to a terephthalic acid residue of another molecule. Such quasi-crystalline relationships are believed to provide anchor points holding the molecules against major displacement, while the long chains of dimerized fatty acid residue allow a rubbery extensibility of the mass.

In the course of cooling a molten body of the tripolyester, the dimerized fatty acid component interferes to some extent with the development of the quasi-crystalline structure by the terephthalate component. Thus at an intermediate temperature at which a terephthalate polyester would have crystallized to an extent providing holding strength, the terephthalate residues of the tripolyester have not fully associated and the holding strength may be much less; although on further cooling the strong rubbery character will develop. That is, in the intermediate temperature range, there exists in a body of the tripolyester some terephthalic acid residue anchor points in a mass of unordered resin, and the body has a mushy consistency with little or no holding power.

However, within the range of relative mol percentage of dimerized fatty acid and phthalate component in the tripolyester of the present invention, the temperature range over which this disruption of mushy effect exists is confined to a narrow band while an effective development of the required rubbery characteristic is obtained.

The addition of a small amount, up to 2 mol percent of a fourth component contributes additional flexibility without incurring "mush trouble." Thus, a long chain ether glycol may replace a part of the shorter chain glycol, such as the 1,4 butylene glycol. A suitable long chain ether glycol, as previously noted, is polybutylene ether glycol, having a molecular weight between 1,000 and 2,000. The glycols are used in excess of stoichoimetric proportions for reaction with the acid components and the excess of the glycol having 2–10 carbon atoms (e.g. the 1,4 butylene glycol) boils off during the condensation reaction so that where the reaction mixture comprises 1% of the amount of long chain glycol required for reaction with the acid components and an excess, e.g. more than 100%, of the 2–10 carbon atoms of glycol required for reaction with the acid components, in the final product, 1 mol percent of the combined glycol residue is the long chain glycol, and 99 mol percent is the 2 to 10 carbon atom glycol.

A suitable polybutylene glycol has a molecular weight of 2000 and is understood to be derived from the polymerization of the butylene oxide. The formula given for this material is:

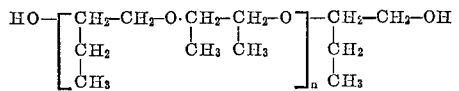

The quick setting yet rubbery properties of the adhesive of the present invention are particularly useful for carrying out the bonding process for applying fibrous rib strips 10 to insoles 12 to form sewing ribs thereon in the manufacture of welted shoes, as shown in FIGS. 1 and 2. An adhesive for use in such a process must not only have a desirable melt flowability for adhering fibrous surfaces, but must have a quick-setting time in order that continued processing does not push the ribbed strip out of position before it has firmly adhered to the insole.

The ribbed strip 10 having an upstanding rib portion 14, and outer 16 and inner 18 attaching flanges as shown in FIG. 1, is attached to the insole 12 with the adhesive of the present invention by the method illustrated in FIG. 2, the procedural aspects of which are more fully disclosed in United States Letters Patent No. 2,979,744, granted April 18, 1961, on an application of Alfred S. Clark.

The strip 10 is drawn from a source of supply 20 consisting of a roll of indefinite length and is guided progressively toward a point 22 where it engages the margin of the insole 12. At a locality 24 just before the point 22 of convergence of strip 10 and insole 12, melted adhesive is introduced between the insole 12 and the flanges 16 and 18 of the strip 10, and the flanges are immediately pressed against the insole 12 to secure the strip 10 permanently thereto. The adhesive which is preferably in the form of an elongated rod 26 of solid thermoplastic cement, is drawn from a source of supply 28 and fed in timed relationship to the feed of the strip toward the point 22 at which the strip 10 engages the insole 12 and, during its travel toward that point through the section 30 is progressively subjected to heat to render it molten. The application of the strip begins at a point along one margin of the insole, for example, at the heel breast line, and proceeds along that margin, then around the toe end, and finally along the opposite margin to a point opposite the starting point. As the attaching operation thus progresses around the periphery of the insole, the successive coated portions of the strip are pressed against the insole and the insole and strip are fed together in determined increments.

The thermoplastic tripolyester adhesive unites the strip to the insole immediately so that the exactly placed strip cannot be pushed out of position in continuance of the operation.

Another property of the bond is that the terephthalate-isophthalate-dimer acid tripolyester although a thermoplastic material differs from most thermoplastic materials in that it is insoluble at room temperature in any of the ordinary organic solvents such as ketones, esters, ethers, naphthas and so on. Thus a bond is unaffected by solvent constituents of bottom filler finishes, cleaning agents or other adhesive materials which may come in contact with the adhesive layer.

*Example 1*

414 grams of a liquid viscous dimerized linoleic acid comprising approximately 95% of dimer and 5% of trimer were mixed with 881 grams of dimethyl terephthalate and 647 grams of dimethyl isophthalate. To this mixture were added 1546 grams of 1,4-butanediol. The mixture was disposed in a closed kettle and heated to a temperature of 120° to 140° C. while bubbling nitrogen through to remove oxygen. This step was carried on for 20 minutes. Thereafter 0.1% by weight based on the weight of the mixture of lead peroxide was stirred in. The mixture was heated with gradually rising temperature for about 6 hours, during which time methyl alcohol displaced from the esters by the butanediol boiled off and was collected. At the end of this time the temperature was about 200° C. When evolution of methyl alcohol substantially stopped, vacuum was applied to the heated reaction mixture and remaining methyl alcohol and excess butanediol boiled off.

Heating was continued and the temperature raised to about 238° C. to effect further polymerization of the polyester in the kettle. This heating was continued for 6 hrs. at the end of which time the melt viscosity of the material at 238° C. was about 70 poises as determined on the Brookfield Viscometer, Model LVF, using the No. 4 rotor at 30 r.p.m.

The molten material was extruded as a stream of relatively thin cross section, i.e., approximately ⅛" as its major thickness. The stream was plunged into cool water directly after extrusion and solidified as a continuous, resiliently flexible, transparent rod of amorphous resin which was collected in a coil for subsequent use.

The resin rod was used on an insole rib attaching machine as described above. The melted cement was applied at a temperature of approximately 150° C. and then pressed into adhesive contact with the surfaces to be bonded. Upon examination, the bond showed a shear strength of 160–175 lbs. using a 1" wide insole strip with a ⅝" wide rib.

*Example 2*

414 grams of a liquid viscous dimerized linoleic acid comprising approximately 95% of dimer and 5% of trimer were mixed with 1162 grams of dimethyl terephthalate and 365 grams of dimethyl isophthalate. To this mixture were added 1450 grams of 1,4-butylene glycol and 175 grams of polybutylene glycol having a molecular weight of 2,000. The mixture was disposed in a closed kettle and treated as the mixture previously described in Example 1, the displaced methyl alcohol and excess glycol boiling off.

At the conclusion of the heating period, the melt viscosity was tested and found to be about 112 poises as determined on the Brookfield Viscometer, Model RVF using the #7 spindle at 20 r.p.m.

Having thus described my invention, what I claim as new and desire to secure by Letters Patent of the United States is:

1. A non-tacky thermoplastic adhesive comprising a resinous linear terpolyester of a linear glycol and acid components, said acid components comprising from 96 mol percent to 80 mol percent of mixed terephthalic and isophthalic acids in the molar ratio of from 6:4 to 9:1 and from 4 mol percent to 20 mol percent of a linoleic acid dimer, said glycol having the formula $HO(CH_2)_nOH$ where $n$ is an even number greater than 1 but not over 10, said resinous terpolyester possessing viscosity characteristics for application in molten form and for solidifying rapidly on cooling to a rubbery condition.

2. A non-tacky thermoplastic adhesive comprising a resinous linear terpolyester of 1,4-butylene glycol and acid components, said acid components comprising from 96 mol percent to 80 mol percent of mixed terephthalic and isophthalic acids in the molar ratio from 6:4 to 9:1 and from 4 mol percent to 20 mol percent of a linoleic acid dimer, said resinous terpolyester having a viscosity from about 50 to about 250 poises at a temperature of 238° C.

3. A non-tacky thermoplastic adhesive comprising a resinous linear terpolyester of a mixture of linear glycols and acid components, said acid components comprising from 92 mol percent to 80 mol percent of mixed terephthalic and isophthalic acids in the molar ratio of from 6:4 to 9:1 and from 7 mol percent to 8 mol percent of a linoleic acid dimer, said glycol mixture comprising 1,4-butylene glycol and up to 2 mol percent of a polybutylene ether glycol having a molecular weight of approximately 2,000, said resinous terpolyester having a viscosity of from about 50 to about 250 poises at a temperature of 238° C.

References Cited by the Examiner
UNITED STATES PATENTS

| | | | |
|---|---|---|---|
| 2,627,508 | 2/1953 | Lum | 260—22 |
| 2,708,278 | 5/1955 | Kamborian | 154—53.6 |
| 2,733,169 | 1/1956 | Holmen et al. | 260—22 |
| 2,905,650 | 9/1959 | Agens | 260—22 |
| 2,926,723 | 3/1960 | Clark | 154—42 |
| 2,936,296 | 5/1960 | Precopio et al. | 260—22 |
| 2,961,365 | 11/1960 | Sroog | 260—75 |
| 3,057,824 | 10/1962 | Le Bras et al. | 260—22 |
| 3,090,772 | 5/1963 | Crowell | 260—75 |

LEON J. BERCOVITZ, *Primary Examiner.*

ALPHONSO SULLIVAN, *Examiner.*